Figure 1:
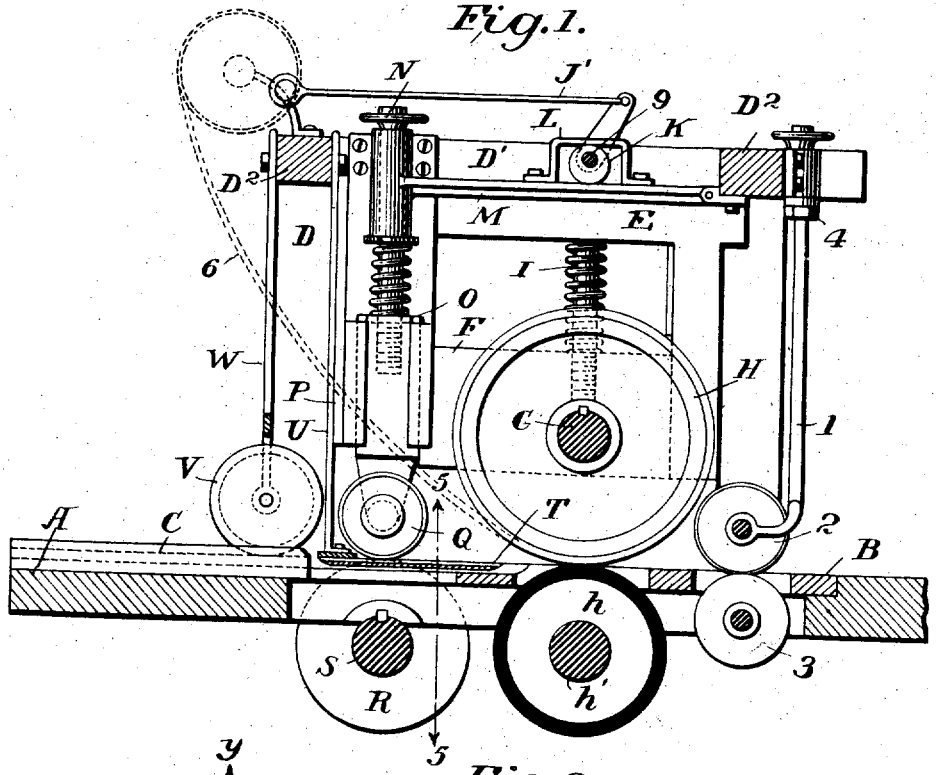

A. A. DENNIS.

PROCESS FOR GLUING VENEERS.

APPLICATION FILED MAR. 18, 1909.

Reissued Nov. 2, 1909.

13,034.

2 SHEETS—SHEET 1.

Witnesses

J. E. Grant.

H. E. Rockwell

Inventor

Alfred A. Dennis by Pennie Davis Marvin & Edmonds

A. A. DENNIS.

PROCESS FOR GLUING VENEERS.

APPLICATION FILED MAR. 18, 1909.

Reissued Nov. 2, 1909.

13,034.

2 SHEETS—SHEET 2.

Witnesses

Inventor

Alfred A. Dennis, by Dennis, Goldsborough & Mill,

Assoc. Attorneys.

UNITED STATES PATENT OFFICE.

ALFRED A. DENNIS, OF GRAND RAPIDS, MICHIGAN, ASSIGNOR TO VENEER MACHINERY COMPANY, OF GRAND RAPIDS, MICHIGAN, A CORPORATION.

PROCESS FOR GLUING VENEERS.

13,034. Specification of Reissued Letters Patent. Reissued Nov. 2, 1909.

Original No. 884,905, dated April 14, 1908, Serial No. 347,182. Application for reissue filed March 18, 1909. Serial No. 484,334.

*To all whom it may concern:*

Be it known that I, ALFRED A. DENNIS, a citizen of the United States, residing at Grand Rapids, in the county of Kent and State of Michigan, have invented new and useful Improvements in Processes for Gluing Veneers, of which the following is a specification.

This invention relates to a process of attaching together by adhesive substances, pieces of veneer, and its object is to provide a process and method for fastening together, edge to edge, strips or pieces of veneer so that the several pieces when united will constitute a larger sheet. This object I accomplish by suitable mechanism and I have shown in the drawings one form of mechanism suitable for performing the process.

Figure 2:
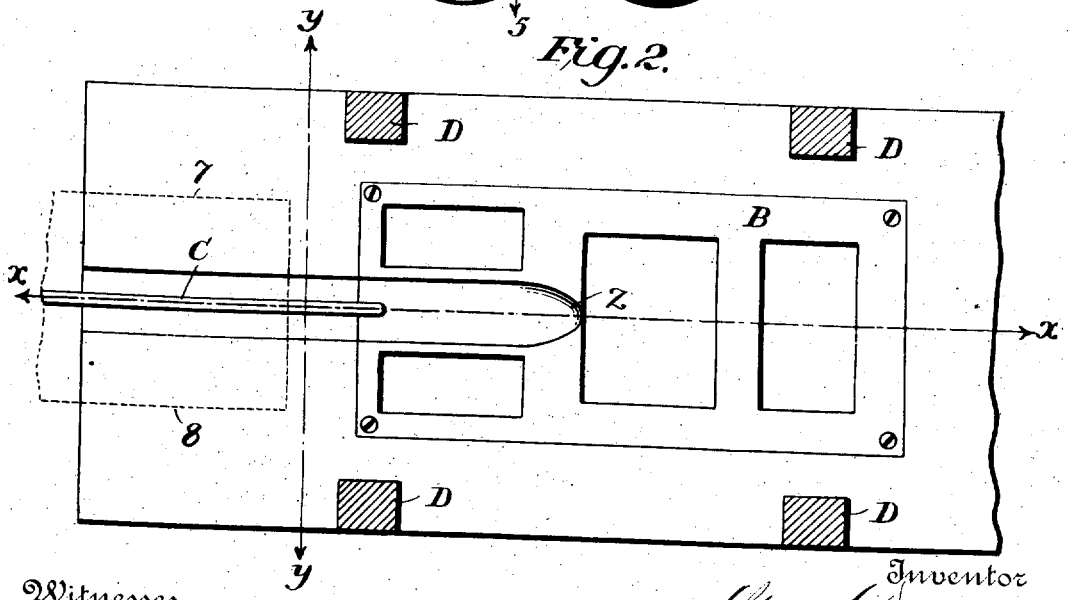
Figure 3:
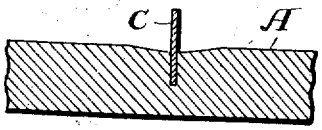
Figure 4:
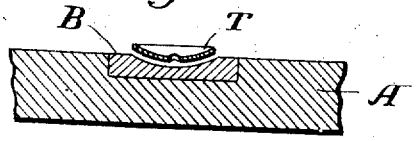
Figure 5:
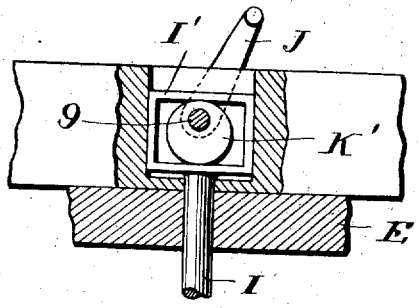
Figure 6:
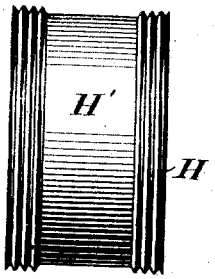
Figure 7:
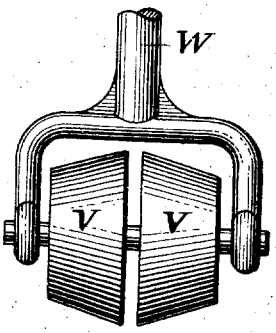
Figure 8:
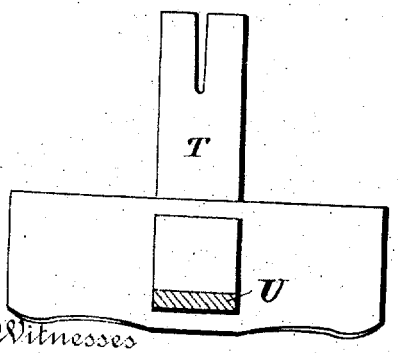
Figure 9:
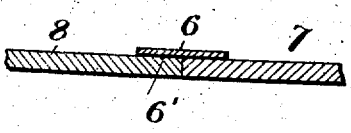

In the drawings Figure 1 is a vertical section of the machine on line $x$—$x$ of Fig. 2, showing also in projection all the parts beyond the plane of the section. Fig. 2 is a top plan view of the main bed or table. Fig. 3 is a broken portion of a vertical cross-section on line $y$—$y$ of Fig. 2. Fig. 4 is a broken portion of a vertical cross-section of the main bed and adjacent parts on line 5—5 of Fig. 1. Fig. 5 is a detail section showing the method of vertically operating the rod I. Fig. 6 shows in detail the pressure roller which attaches the adhesive tape. Fig. 7 is a detail perspective of a pressure roller used to aid in properly feeding the veneer strips. Fig. 8 is a top plan view of the same parts shown in Fig. 4, and Fig. 9 is a section showing the veneer strips and attaching tape.

For the purpose of attaching the two strips together, edge to edge, I use a prepared adhesive tape, made of cloth, paper, or any suitable material, which is fed from any suitable drum or roll, as indicated by the numeral 6 and by the dotted lines in Fig. 1. This prepared tape is coated with an adhesive substance of such composition that when cold it will not adhere, or will adhere only slightly so that it may be uncoiled from a reel and such that immediately upon the application of heat it becomes highly adhesive, and by the application of a sufficient degree of heat becomes very firmly and strongly set and attached to any surface in contact with it.

The tape used in connection with the joint as above specified may be of any preferred form or of that type which is affected by heat similar to well known surgeon's adhesive plaster and having such width as to render it practicable for its intended use in this instance. This tape may be as broad or as narrow as desired, but in practice I have found it desirable to make the same about one inch in width.

A represents the main bed frame or table of the machine, provided with suitable openings, as shown in Fig. 2, to permit the various pressure rollers and feeding devices to pass therethrough. I have constructed these openings in a metal plate B, which I have inserted in the main bed, as shown in Figs. 1 and 2. Upon the upper surface of the main bed A and running also into the inserted plate B, if such be used, I hollow out a groove-like depression as wide and as deep and of such exact form in cross-section as may be desired. This groove is shown in cross-section in Fig. 3, in its outer portion, being there angular, and is shown in cross-section in its inner portion in Fig. 4, being there concave. At its inner end, and at or near the point where the tape-attaching roller makes contact with the veneer strip, this groove gradually runs out into the plane of the surface of the bed, as shown by Z in Figs. 1 and 2.

C, shown in Figs. 2 and 3 and indicated by dotted lines in Fig. 1, is a vertical plate at the bottom of this groove, extending toward its inner end, but terminating somewhat short thereof and serving as a partition between the two longitudinal halves of the groove.

D D D D are the four corner posts of the frame suitably attached to the main bed and rising therefrom and supporting and carrying other parts of the machine. These posts are connected at the top in one direction by the cross bars D′ and in the other direction by the cross bars $D^2$. Sliding vertically in the cross bars D′ and other portions of the frame are the rods I I, one at each side of the machine. These rods carry at their lower end the horizontal power shaft G to which positive motion is imparted by any suitable means; and through these rods I I this shaft G and the roller which it carries may be raised or lowered.

A suitable tension spring may be used as shown in Fig. 1 to give an elastic pressure to the roller H, which is the roller carried and operated by the shaft G. This roller H may have its surface in any suitable form, but I have found the form shown by Fig. 6 especially desirable. This has a surface H′ as great as, or greater than the width of the tape to be attached and has at each side of such surface, and projecting very slightly beyond the same, a corrugated portion.

It is apparent that when the main central portion is pressed down upon the tape with sufficient pressure to attach the same, these corrugations will very firmly bite the wood at each side of the tape, and will insure the forward motion of the veneer strips in a direct line of travel and without any possible slip or motion laterally or at an angle to such line of travel.

The vertical rods I are operated vertically by the construction shown in Fig. 5. The upper portion of the rod carries an eccentric guide I′, which I have shown rectangular in form. This contains the eccentric K′ carried on the shaft 9. The shaft is rocked by the lever J and the lever J is operated or pulled forward by the arm J′, shown in Fig. 1. It is evident that as the arm J′ is pulled forward the eccentric K′ will operate to raise the eccentric guide I′, and therefore the rod I, and will thus release the pressure upon the veneer strips, while the roller and the shaft H G are free to continue their revolving motion.

The arm J′ on the lever J and rock-shaft 9 also operate a similar eccentric K, which works in and operates the eccentric guide L, as shown in Fig. 1. This latter eccentric and guide are attached to the arm M, which is pivoted at its rear end to a suitable portion of the frame, and at its forward end carries the vertical rod O. This rod O is provided with a suitable tension spring and may be further adjusted by the set screw N above the same. This rod O carries at its lower end the roller Q, which thus exerts a downward and elastic pressure upon the veneer strips. When the shaft 9 is rocked forward the eccentric K will raise the arm M and thereby raise the rod O simultaneously with the rod I and release also this pressure upon the veneer strips.

The shaft G is journaled in the vertically movable box F which slides upon suitable guides, depending from any suitable portion of the frame, marked and indicated in Fig. 1 by the letter E; and in a similar way the roller Q, journaled in the lower end of the rod O, is guided in its vertical motion by the guides P. These guides P and the guides upon the frame E are ordinary V guides in the construction which I have shown.

R is a power feed roller situated below the table and projecting up therethrough. It is carried on and operated by the shaft S, which in turn is operated by any suitable means.

*h* is a pressure roller situated below and opposite and normally nearly or quite in contact with the roller H. This roller *h* I find should be elastic in its operation, and I have produced this result in the form of machine shown in the drawings by covering the same with an elastic band. It is carried by the shaft *h′*.

At the rear portion of the machine are the upper and lower pressure rollers 2 and 3, shown in Fig. 1. One of these is made adjustable. I have shown the upper one carried by the rod *l*, which is vertically on the frame in any suitable way, as by the adjustable nut 4. I thus provide the machine with four pairs of pressure rollers, or feed rollers, namely, the rollers Q and R, of which there are two pairs, the same being duplicated upon each side of the device, and the rollers *h* H and the rollers 2 3. Of these H and R are power feed rollers. The remainder are idlers. All of them can be further provided with such adjustability, frictional surfaces and elasticity as the special requirements of the work may indicate. The rollers Q and R should especially be provided with such corrugations or other frictional surfaces as will additionally insure the direct forward travel of the strips and prevent any lateral slip and sufficiently resist any tendency to lateral slip or angling motion which may be caused by the crowding of the two strips together as they leave the groove at Z.

W V V is a pressure roller, or, rather, a guide operating to hold the two strips of veneer down in the bottom of the groove as they move forward in their direct travel, and it should present upon its lower surface a line of the same formation as the bottom of the groove at that point, and be raised above such bottom the thickness of the veneer. I have shown it as being vertically adjustable by means of its carrying rod W adjustably attached to the frame. A similar function is performed further along in the groove and toward its rear end by the guide T. This is carried by the vertically adjustable rod, or plate, U, adjustably attached to the frame, and this guide extends along over the groove and is upon its under surface of a shape corresponding to the bottom of the groove. It insures that the veneer shall lie smoothly in the groove and in contact with the bottom thereof as the veneer moves forward in the groove.

The operation of the device has been in most respects already sufficiently described. I take two veneer strips, represented by 7 and 8 in Fig. 9, and feed them along the bed or table in such a way that their inner edges pass under the guides V V and are forced down into the bottom of the groove. They are then fed along, being held apart by the partition C and being farther on held down in the groove and in contact with its bottom by the guide T. As they reach about the inner end of the partition C they are seized and fed forward in an absolutely direct and parallel line of travel by the rollers Q R. Just as they reach the rollers H *h* the bottom of the groove rises to the plane of the surface and the edges of the two strips are therefore brought together so as to make a tight joint. This can be regulated by changes in the width of the partition C and in the depth of the groove. Thus the edges will be forced together more or less tightly as may be desired, but the main body of the veneer strips cannot yield laterally. The adhesive tape is then attached in the form shown in Fig. 9 in which 6 represents the tape and 6′ the adhesive material thereon, and the two strips, united so as to be one, pass on between the pressure rollers 2 3 which serve as additional guides to cause direct travel, and also, in some measure, additionally to attach the tape, and they are then delivered at the rear of the machine completely and satisfactorily united.

The roller H is, when in operation, heated to such a degree that heat is imparted through the fabric to the adhesive material upon the under side of the strip or tape, and the adhesive material is thus softened so that it adheres very firmly to the wood. At the same time the heat must not be intense enough to scorch or injure the wood itself. This heating may be accomplished in any well known manner, as, for example, by introducing a gas flame into the interior; but as the means for heating the roller constitute no part of this process, I do not describe the same in detail, and have not illustrated the same.

The progress of the veneer strips through the machine is slow and thus the heat derived from the heated roller as the tape approaches the roller and is drawn underneath is sufficient to affect the adhesive material to make it softer and more adhesive, while the continued heat as the tape passes beneath the roller and away therefrom is sufficient thoroughly to dry the glue or other adhesive material. I am thus enabled by using a tape of the class described and a heated roller, to accomplish the softening and the drying of the adhesive material by one operation.

When the veneer strips have come through the machine united together as described, they may be turned over and laid with the tape in contact with the body of the wood of which the veneer is to form the face. A layer of glue is interposed between such body and the veneer and the two are then attached together permanently by veneer presses, or in any well-known manner. A thin tape sinks into the interposed body of glue and as a result the upper or veneer surface is perfectly plain, and the presence of these fabric strips or tapes cannot be detected, the finishing surface being as perfect as if no such tapes were underneath.

If preferred, the veneer may be attached to the body by glue and veneer presses in the usual way, and with adhesive tapes on the upper surface. These tapes may then be removed, leaving underneath them the perfect veneer joint which they have assisted to produce, and a perfect surface for a final finishing will thus be presented, such adhesive material as remains upon the veneer being easily removed.

By using an adhesive tape of the class described I avoid the necessity of smearing the surface of the strip with liquid glue with its resultant inconveniences and difficulties, and by applying the attaching pressure and the modifying heat simultaneously, I accomplish very firm and perfect union in a simple and efficient manner.

It is important that as the veneer strips are being operated upon they may be held firmly together, edge to edge, so that they cannot pull apart sidewise or separate, and that for this purpose lateral pressure in some suitable form should be exerted.

The mechanism which I have shown exerts lateral pressure upon only adjacent, or nearly adjacent, portions of the strips instead of upon the whole strip, but the same perfect union is thereby caused; and in this manner these adjacent, or nearly adjacent, portions of the strips of veneer are in oblique relation to each other,—that is to say, any two selected points upon the opposite meeting edges of the two strips as they travel forward also slightly approach each other, and these points, therefore, move obliquely toward each other.

Having thus described my invention, what I claim to have invented and desire to secure by Letters Patent, is—

The herein described process of attaching pieces of veneer consisting in feeding pieces of veneer in oblique relation to each other to a pressure device and exerting lateral pressure to hold the adjacent edges in close union, applying to the adjacent edges strips of adhesive material and subjecting the strips to pressure to cause the adhesive material to become firmly attached and applying heat at the point of attachment of the adhesive material to secure the adhesive material to the strips.

In testimony whereof, I have hereunto set my hand in the presence of two subscribing witnesses.

ALFRED A. DENNIS.

Witnesses:
R. W. IRWIN,
J. L. BUCHANAN.